United States Patent [19]

Ausnit

[11] Patent Number: 4,894,975

[45] Date of Patent: * Jan. 23, 1990

[54] METHOD AND APPARATUS FOR MAKING RECLOSABLE BAGS WITH FASTENER STRIPS IN A FORM FILL AND SEAL MACHINE

[75] Inventor: Steven Ausnit, New York, N.Y.

[73] Assignee: Minigrip, Inc., Orangeburg, N.Y.

[*] Notice: The portion of the term of this patent subsequent to Dec. 1, 2004 has been disclaimed.

[21] Appl. No.: 166,024

[22] Filed: Mar. 9, 1988

[51] Int. Cl.$^4$ ............... B65B 61/18; B65B 9/08
[52] U.S. Cl. ................... 53/412; 53/133; 53/451; 53/551
[58] Field of Search ............ 53/128, 133, 410, 412, 53/450, 550, 551, 552, 451

[56] References Cited

U.S. PATENT DOCUMENTS

| | | | |
|---|---|---|---|
| 3,172,443 | 3/1965 | Ausnit | 206/620 |
| 3,815,317 | 6/1974 | Toss | 53/551 X |
| 4,355,494 | 10/1982 | Tilman | 53/551 X |
| 4,532,754 | 8/1985 | Hokanson | 53/551 X |
| 4,589,145 | 5/1986 | Van Erden et al. | 53/410 X |
| 4,601,694 | 7/1986 | Ausnit | 493/214 X |
| 4,709,533 | 12/1987 | Ausnit | 53/451 |
| 4,727,709 | 3/1988 | Zieke et al. | 53/551 |
| 4,745,731 | 5/1988 | Talbott et al. | 53/551 |

FOREIGN PATENT DOCUMENTS 1186733 4/1970 United Kingdom ............ 156/66

Primary Examiner—Robert L. Spruill
Assistant Examiner—Beth Bianca
Attorney, Agent, or Firm—Hill, Van Santen, Steadman & Simpson

[57] ABSTRACT

A method and apparatus for forming a tube and bag from a supply of thin thermoplastic film with the film being formed into tubular shape about a filling tube with the edges of the film brought together and joined solely by a zipper strip having reclosable pressure interlocking members thereon with the zipper strip preferably heat sealed to the film and the zipper strip having a web between the pressure interlocking members which provides a tamper-evident juncture between the edges of the film so that the web must be severed for access to the interior of a bag formed from the film, and individual bags formed from the continuous tube by filling the tube through the filling tube and cross-seaming and cutting individual bags from the continuous film tube.

19 Claims, 2 Drawing Sheets

U.S. Patent  Jan. 23, 1990  Sheet 1 of 2  4,894,975
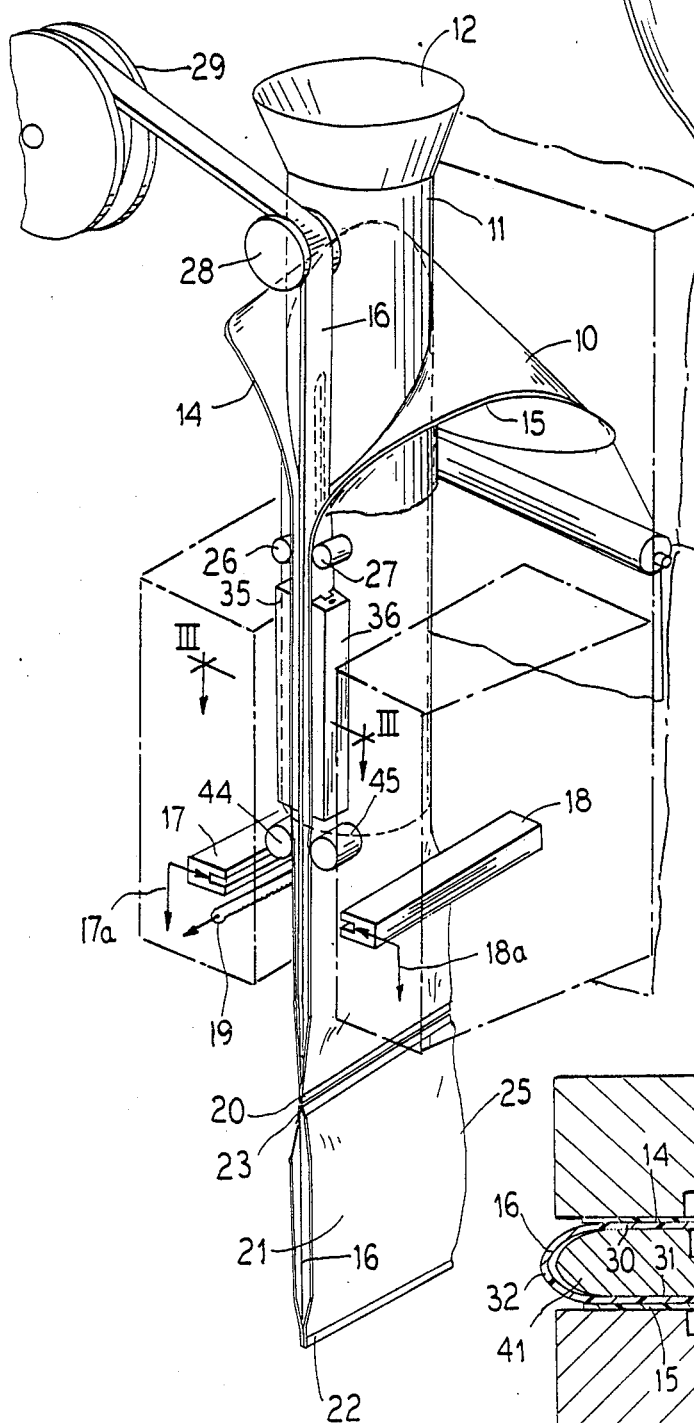
FIG. 1
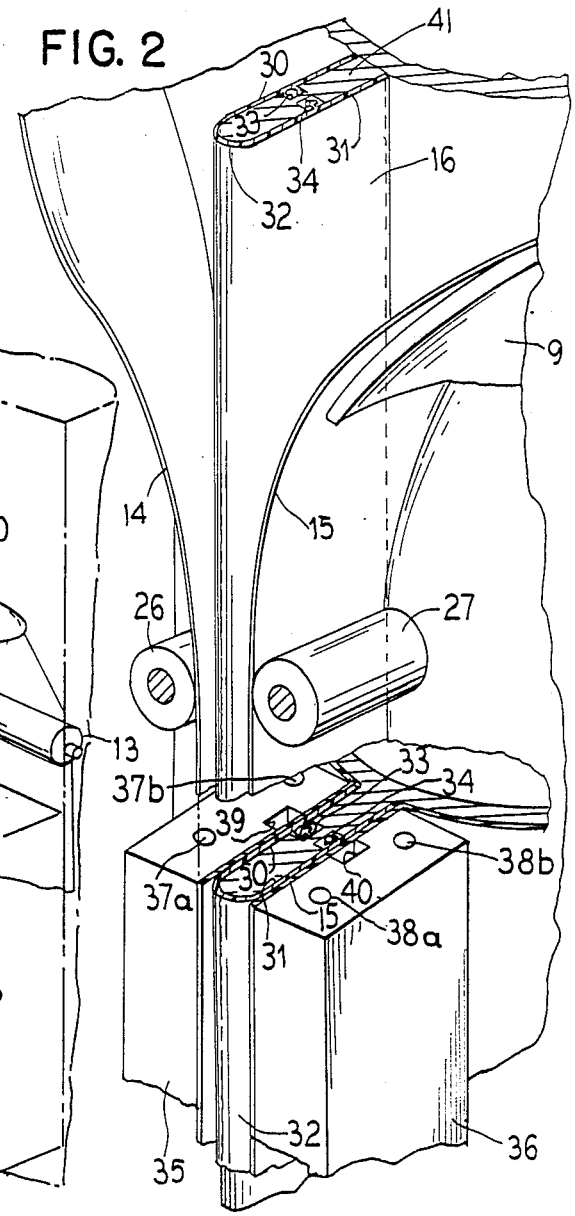
FIG. 2
FIG. 3

METHOD AND APPARATUS FOR MAKING RECLOSABLE BAGS WITH FASTENER STRIPS IN A FORM FILL AND SEAL MACHINE

BACKGROUND OF THE INVENTION

The invention relates to improvements in methods and apparatus for making reclosable bags and particularly in a form fill process wherein completed reopenable bags are formed by feeding film downwardly over a filling spout. More particularly, the invention relates to an improved manner in which completed packets or bags are formed with a reclosable zipper at the opening. A safety seal joins the edges of the bag opening in a manner to provide the sole joining means and provide an air-proof and moisture-proof seal for the bag opening and also to provide a tamper-evident means by a web between the elements of the zipper, which web must be severed or torn for access into the bag.

The art of making reclosable bags equipped with extruded plastic profile reclosable separable fastener means has experienced a long period of development as reflected in numerous patent disclosures. It has been conventional practice to extrude plastic material in tubular or sheet form with the profile separable fastener means co-extruded along and parallel to the longitudinal formation axis of the web, that is, the direction in which the web is extruded. On the other hand, prefabricated separable fastener strip means have been secured to separately formed web and with the fastener strip means extending longitudinally parallel to the longitudinal formation axis of the web. By way of example, U.S. Pat. No. Re. 29,043 is referred to as disclosing coextrusion of web and fastener means and forming the same into bag sections.

U.S. Pat. No. 3,948,705 exemplifies the technique of securing reclosable fastener strips to the plastic film parallel to the longitudinal formation axis of the web by fusion or heat seal methods.

Attachment of separable fastener strips parallel to the longitudinal formation of the axis of the web by adhesive means is exemplified in U.S. Pat. Nos. 4,372,793, 4,354,541 and 4,355,494.

U.S. Pat. No. 4,046,408 discloses separably interlockable fasteners along the edges of the plastic sheet material having generally arrow-shaped profiles, the fasteners being either integrally extruded from flat sheets or tubes of plastic film or supplied in the form of extruded strips attached to the web or film by heat sealing.

In the formation of reclosable plastic bags when the bags are used for foodstuffs and like material, it is advantageous to have the bags supplied with a tamper-evident seal which not only protects the contents from the ingress of foreign materials and contamination, but also shows if inadvertent or intentional opening has occurred prior to the bag and its contents being in the possession of the buyer. Such a protective seal if formed continuous externally of the reclosable seal rather than internally, can additionally protect the reclosable zipper elements from dust and dirt and other contaminants with a permanent protective seal located outwardly of the reclosable seal, moisture and other foreign elements cannot enter the bag and the purchaser can see that he is obtaining a previously unopened and unused bag where the contents are fully protected. This conveys a feeling of safety and comfort to the purchaser who may be concerned about someone criminally obtaining access to the bag and placing dangerous contaminants into the contents.

Examples of tamper-evident structures are shown in U.S. Pat. Nos. 2,978,769, 3,172,443, 3,685,562 and 3,780,781.

My recently issued U.S. Pat. No. 4,709,533 discloses a tube made from film in a form fill process wherein the tube has fastener strips joined to the inner surface of the film material inside of a fin seal made between the edges of the film. This method and structure while providing advantages over arrangements heretofore used, requires that sufficient film be provided to be joined outside of the fastener strips, and the joined fin seal of the film is limited to being of the weight of the film.

SUMMARY OF THE PRESENT INVENTION

With the present invention, the problems, disadvantages and shortcomings inherent in prior art techniques are overcome especially as related to vertical form, fill and seal arrangements for making and filling bags, and particularly for bags which have a tamper-evident arrangement which must be severed or torn for access to the bags.

An object of the present invention is to provide an improved method and apparatus for making and filling bags by a form fill technique wherein a reclosable zipper is fastened between the edges of film which are to form the top lips of a bag and the zipper is utilized as the sole juncture between the edges of the film.

A further object of the invention is to provide an improved method and apparatus for making and filling bags and an improved bag structure wherein the bag has a reclosable zipper along the top and a tamper-evident arrangement between the strips of the zipper either above or below the interlocking elements provided wholly by the structure of the zipper and not limited to the limitations of the film of the bag.

A further object of the invention is to provide an improved bag having a security seal or tamper-evident means which has greater capabilities and less limitations than structures heretofore available.

In accordance with the principles of the present invention, an apparatus and method is provided wherein film is fed downwardly wrapped around a form film tube and the edges of the film are brought together in adjacency. The adjacent edges of the film are joined such as by heat sealing to interlocking zipper members, which thereafter form the sole juncture between the edges of the film and which zipper members provide a reclosable opening for the top of the completed bag. The bag is filled through the filling spout and the tube is cross-sealed and portions are cut off to form the bags. A web extends between the zipper strips, either above or below the interlocking elements, which web can be constructed of a weight and width with optimum characteristics for forming a security seal at the top of the bag and forming a tamper-evident seal. In a single rapid operation, a bag is formed wherein the film of the bag has optimum characteristics for the bag, and the plastic of the zipper and of the web therebetween have optimum characteristics for the functions of the zipper and functions of the security tamper-evident seal.

Other objects, features and advantages of the present invention will become more apparent in connection with the teachings of the principles thereof in the specification, claims and drawings in which.

DESCRIPTION OF THE DRAWINGS

FIG. 1 is a perspective view with portions shown in phantom view and portions shown somewhat schematically of an apparatus constructed and operating in accordance with the principles of the present invention;

FIG. 2 is a fragmentary view somewhat similar to FIG. 1, shown in perspective and shown somewhat enlarged from FIG. 1 of portions of the of FIG. 1;

FIG. 3 is a fragmentary enlarged sectional view taken substantially along line III—III of FIG. 1;

DESCRIPTION OF THE PREFERRED EMBODIMENT

Figure 6:
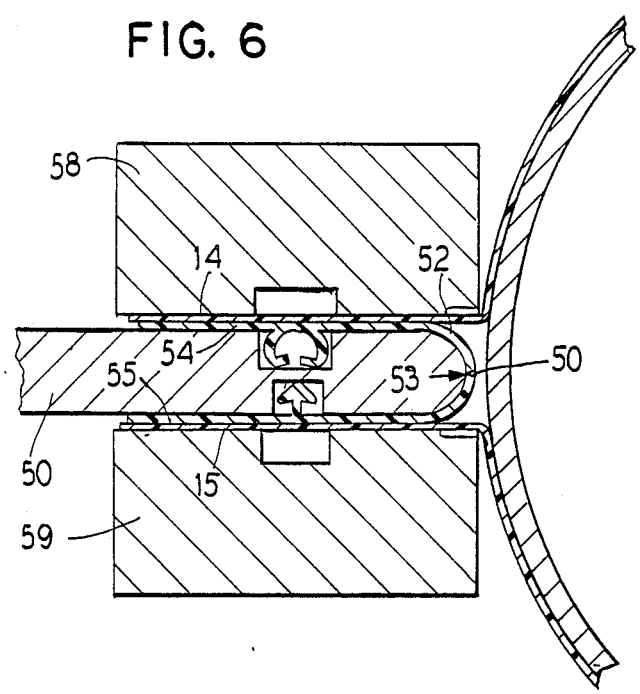
FIG. 6 is another view similar to FIG. 5 and illustrating another form of attaching the fastener to the bag.

As illustrated in FIGS. 1 through 3, a thin thermoplastic film such as polyethylene is fed into a form, fill and seal arrangement to make and fill individual bags which have a reclosable fastener at the top. The film 10 is shaped in cylindrical or tubular shape by being fed over a filling tube 11. The filling tube has an upper funnel end 12 through which contents are discharged to fall downwardly into individual bags.

The film is fed forwardly from a supply source, not shown, over a guide roll 13 and may be shaped around the filling tube by shoulders, such as shown generally at 9 in FIG. 2. The film is advanced by being pulled down incrementally the width of each bag which is to be formed.

The edges of the film 14 and 15 are brought together into adjacency and a zipper strip 16 is fed between the edges. While the edges are brought into adjacency, they are not brought together and are merely laid in face-to-face or confronting relationship against the outer surfaces of the zipper strip 16.

The film is pulled downwardly by cross-sealing bars 17 and 18 which have movement indicated by the arrowed lines 17a and 18a. The bars 17 and 18 are first brought together against the tubular film at a location where it has descended below the lower end of the filling tube 11 in order to form a cross-seal to join the faces of the film. This provides a side seam for the bag, closing the tube so that as contents are dropped through the filling tube 11, they are retained within the bag. Essentially simultaneously with the sealing by the bars 17 and 18, a cutting knife 19 is moved across the film to remove an individual previously filled bag from the tube. The sealing bars 17 and 18 will be first brought together as indicated by the horizontal portions of the arrowed lines 17a and 18a and then will move vertically downwardly as indicated by the vertical portions of the arrowed lines 17a and 18a to draw the film downwardly and thereby form the next bag.

The completed bag shown at 21 has its bottom 25 formed by the doubled film and its side seams at 22 and 23 are formed by the action of the sealing bars 17 and 18. The side edge of the succeeding bag is shown at 20 closed so that the contents can drop down and be retained in the bag so that the bag is essentially filled through its side. The top is closed solely by the zipper strip 16 with the adjacent edges of the film 14 and 15 sealed thereto as will be described further in connection with FIGS. 1 through 3.

As the zipper strip 16 descends and is fed between the adjacent edges 14 and 15 of the film, the edges of the film are pushed against the outer surfaces of the strip by guide rollers 26 and 27. The assembled strip 16 and edges 14 and 15 are then joined by heat sealing bars 35 and 36. The zipper strip is fed off of a supply roll 29 over a guide roll 28 between the film edges 14 and 15. The zipper strip may have on it preformed spot seals that are indexed to be aligned with the cross bars 17 and 18 or such spot seals may be added to the zipper strip while the strip proceeds through the form, fill and seal machine, by adding a spot seal station after rolls 44 and 45 but before cross bars 17 and 18.

The zipper strip 16 preferably is U-shaped having webs 30 and 31 with pressure interlocking coacting profiles 33 and 34 thereon. While the profiles and their webs may be separate, in a preferred form, they are joined by a security web 32 which operates to make the bag pilfer-evident and provides insurance that the bag will be closed with integrity against the entry of foreign elements, and in some instances with moisture-tight integrity until the contents are used when the bag is opened.

The pressure interlocking fastener profiles are shown as including a groove 33 with a rib shaped element 34 which interlock when pressed together and which separate when pulled apart by grasping flanges that become available when the integrity web 32 is broken.

The zipper strip 16 is guided downwardly by a fin 41 which is rounded at its outer edge and which has grooves 42 and 43 in which the profiles 33 and 34 slide as the zipper strip moves vertically downward. The fin is supported on the filler tube 11.

As the film and the zipper strip descends, pulled down by the vertical movement of the sealing and clamping bars 17 and 18, the edges 14 and 15 of the film are sealed to the outer surfaces of the zipper webs 30 and 31. This sealing is accomplished by heated sealing bars 35 and 36 which have an inwardly smooth metal surface to slidably contact the outer surfaces of the film. The film is pressed tightly against the zipper strips 16 by rollers 26 and 27 as the zipper strip and film move downwardly between the bars 35 and 36. The bars 35 and 36 have heating elements 37a and b and 38a and b, FIG. 2, embedded therein. Any combination of these heating elements may be used. For example, in certain instances it may be preferable to use only elements 37a and b and element 38a. Heat is transferred through the film to secure the film edges 14 and 15 to the outer surface of the zipper strip. To avoid heat being transmitted directly to the profiles to possibly distort them, grooves 39 and 40 may also be provided in the inner surfaces of the heating blocks 35 and 36 with the grooves being located opposite the profiles 33 and 34. The fin 41 has a smooth outer surface so that the zipper strip slides smoothly downwardly while the heat seal is being performed.

Immediately after the webs of the zipper strip are sealed to the edges of the film, the sealed portions pass beyond the lower end of the sealing blocks 35 and 36 and the groove 33 and rib 43 are occluded by pressure rollers 44 and 45, FIG. 1. Thus, the zipper strip forms the closure for the top of the bag with the integrity web portion 32 sealing the bag and the rib and groove elements additionally interlocked.

Figure 4:
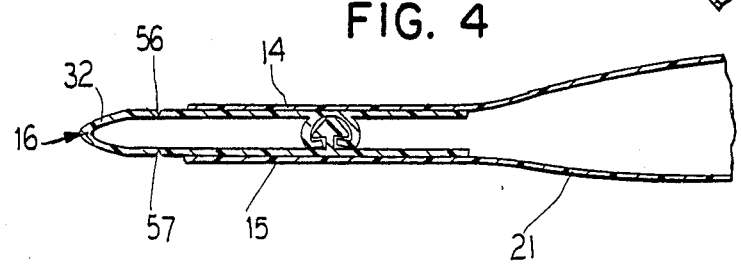
FIG. 4 is a horizontal sectional view taken through the edges of the film of the tube formed by the structures of FIGS. 1 and 2 illustrating the relationship between the elements.

FIG. 4 is a vertical sectional view through the top of the bag showing the relationship of the parts after the rib and groove have been interlocked. The zipper strip has the security web portion intact so that the bag opening remains closed and is protected. The web 32 may be formed with parallel lines 56 and 57 of weakened tear resistance thus permitting the top of the web 32 to be torn off when the bag is to be used. When the top portion is torn off, upwardly projecting flaps remain for the user to pull apart the rib and groove elements to open the bag. The bag is reclosed by pressure pressing the rib back into the groove element.

Figure 5:
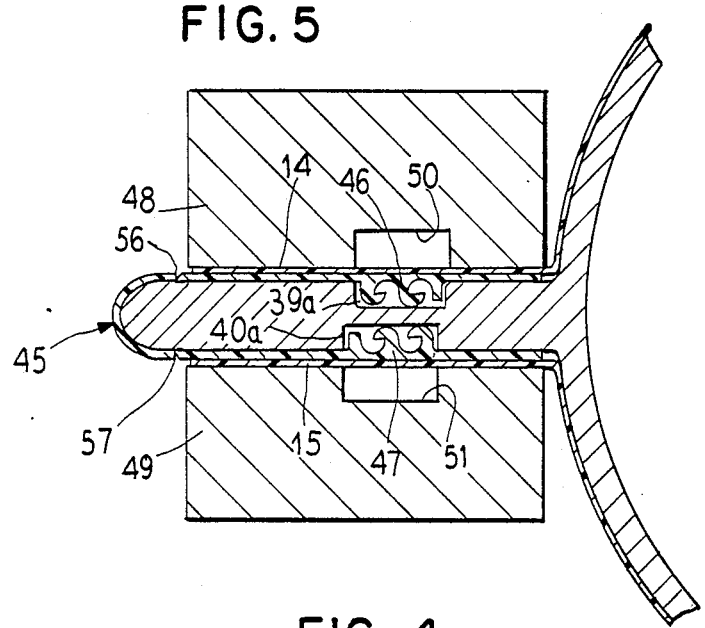
FIG. 5 is an enlarged fragmentary view illustrating the manner of attaching fastener to the film of the bag.

FIG. 5 illustrates a modified form wherein the edges 14 and 15 of the film are secured to the outer surfaces of a zipper strip 45. The zipper strip 45 has side webs which support pressure closable rib and groove elements 46 and 47 which may have multiple heads and grooves. Heat sealing blocks 48 and 49 have channels 50 and 51 therein so that the heat of the blocks 48 and 49 is not transmitted to deform the rib and groove elements 46 and 47. The zipper strip 45 may have lines 56 and 57 of weakened tear resistance for pulling off the top portion of the web when the bag is to be used.

FIG. 6 illustrates another important form of the bag arrangement wherein the position of the zipper strip is inverted relative to its position in the arrangement of FIG. 1. In this arrangement, a zipper strip 53 is again positioned between the film edges 14 and 15 and the film edges are sealed to the web surfaces 54 and 55 of the zipper strip 53. FIG. 6 illustrates heated blocks 58 and 59 sealing the edges 14 and 15 of the film to the zipper strip 53. The zipper strip may have a line 50 of weakened tear resistance so that the zipper strip can be separated into two parts when the bag is to be used. In this arrangement, the guide fin 60 is not attached to the filler tube, but fixed to a part of the frame of the form, fill and seal machine. Until the time the bag is used, the zipper strip provides a security seal for making the bag a tamper-evident bag. In other words when the user obtains the bag, he will know immediately whether it has been previously opened by noticing whether the web portion 52 which bridges the sides of the zipper strip has been broken. The lines of weakened tear resistance which are shown at 50 in FIG. 6 and which are shown at 56 and 57 in FIGS. 4 and 5 may be formed by a mere V-shaped channel in the surface of the plastic of the zipper strip. If the lines 56 and 57 or 50 are perforated, the bag will still provide a tamper-evident bag, but the moisture-tight integrity will be lost and it will be necessary to provides lines of weakened tear resistance which do not penetrate the plastic of the zipper strip if moisture-proof integrity must be maintained.

In operation, a series of bags are formed by feeding film 10 downwardly over a filling tube 11. The film edges 14 and 15 are brought into adjacency and sealed to the outer surfaces of a zipper strip 16. Only sufficient film need be provided to reach the zipper strip and the edges of the film are not attached to each other. The zipper strip thus provides the closure for the bag which eventually will be the bag top. The plastic of the web portion which is shown at 32 and which extends between the sides of the zipper strip can be chosen to be of the weight necessary to keep the bag closed in a hermetic or tamper evident manner either above or below the zipper interlocking elments and the thickness of this plastic can be selected of any thickness desired regardless of the bag film required to form the side walls of the bag. In a simple sealing operation, the edges 14 and 15 are joined to the zipper strip to form a completed bag when the bag is filled and ends are severed from the tubular length. An improved bag results by utilizing a film of uniform thickness and of optimum characteristics for the bag while at the same time providing a plastic of a type and thickness which best meets the requirements of reclosable rib and groove elements and of a security moisture integrity web across the top of the bag. The zipper strip can be installed in either direction, that is, with the web projecting outwardly as shown in FIGS. 4 and 5 or with the web projecting inwardly as shown in FIG. 6. In the arrangement of FIG. 6, the projecting ends of the webs of the closure provide flanges for later opening the bag. In the arrangements of FIGS. 4 and 5, the web portions beneath the top joining strip provide flanges for opening the bag.

Thus, it will be seen that there has been provided an improved method and apparatus and an improved bag which meets the objectives and advantages above set forth and attains an improved bag well suited for foodstuffs and other merchandise which must be protected.

I claim as my invention:

1. The method of forming a vertical tubular form fill reclosable bag from a sheet of plastic film comprising the steps:

continuously feeding a supply of thin thermoplastic film from a supply means;

wrapping the film into tubular shape over a filling spout bringing the lateral edges of the film together in adjacent relationship to form a tube;

feeding a continuous supply of plastic zipper strip having webs with first and second reclosable pressure interlocking members thereon into a space between said film edges;

attaching the webs of said members to the film between said film edges so that said strip provides the sole means joining said edges and said strip provides a reopenable closure for a bag formed of said film; and wherein said interlocking members are joined by one of said webs and said one web must be separated for access to the interior of a bag formed by said film.

2. The method of forming a vertical tubular form fill reclosable bag from a sheet of plastic film in accordance with the steps of claim 1:

including locating said one web outwardly of the interlocking members so that the web must be separated for access to the members.

3. The method of forming a vertical tubular form fill reclosable bag from a sheet of plastic film in accordance with the steps of claim 2:

wherein means defining a tear line is provided in said one web between the members for parting of the web and separating the interlocking members.

4. The method of forming a vertical tubular form fill reclosable bag from a sheet of plastic film in accordance with the steps of claim 1:

including forming a cross-seal laterally across the film at a location after the members are attached to the film.

5. The method of forming a vertical tubular form fill reclosable bag from a sheet of plastic film in accordance with the steps of claim 4:

wherein said plastic zipper has spot seals thereon indexed to be aligned with said cross-seals.

6. The method of forming a vertical tubular form fill reclosable bag from a sheet of plastic film in accordance with the steps of claim 4:
including forming a spot seal on the zipper strip joining said interlocking members and indexing said spot seal to be aligned with said cross-seal.

7. The method of forming a vertical tubular form fill reclosable bag from a sheet of plastic film in accordance with the steps of claim 4:
including laterally cutting the tubular film through the cross-seal location so that a succession of reclosable containers are formed from the tube sealed at their ends.

8. The method of forming a vertical tubular form fill reclosable bag from a sheet of plastic film in accordance with the steps of claim 4:
including depositing a quantity of contents through the filling spout after the formation of the cross-seal so that a container formed by the cross-seal receives the contents.

9. The method of forming a vertical tubular form fill reclosable bag from a sheet of plastic film comprising the steps:
continuously feeding a supply of thin thermoplastic film from a supply means;
wrapping the film into tubular shape over a filling spout bringing the lateral edges of the film together in adjacent relationship to form a tube;
feeding a continuous supply of plastic zipper strip having webs with first and second reclosable pressure interlocking members thereon into a space between said film edges;
attaching the webs of said members to the film between said film edges so that said strip provides the sole means joining said edges and said strip provides a reopenable closure for a bag formed of said film;
wherein said interlocking members are joined by one of said webs and said one web must be separated for access to the interior of a bag formed by said film; and
wherein said one web is located inwardly of said members so that the members are separated before separating said web for access to the interior of the bag.

10. An apparatus for forming a vertical tubular form fill reclosable bag from a sheet of plastic film comprising in combination:
means for continuously feeding a supply of thermoplastic film to form a tube;
a supply spout for vertically dropping contents into the tube;
means guiding and wrapping said supply of film about the tube as the film moves downwardly;
first guide means positioned relative to the spout for bringing the lateral edges of the film into adjacency;
zipper feed means feeding first and second continuous zipper strips having webs with reclosable pressure interlocking members into a space between the film edges;
attaching means joining the edges of the film to said webs of said interlocking members so that said members provide the sole means for joining said film edges and the members provide a reclosable closure for a bag formed of said film; and
wherein said interlocking members are joined by a web portion connecting said webs which must be separated for access to the interior of a bag formed by the film.

11. An apparatus for forming a vertical tubular form fill reclosable bag from a sheet of plastic film in accordance with the structure of claim 10:
wherein said first guide means includes a pair of opposed pressure rollers urging the edges of the film together against the interlocking members.

12. An apparatus for forming a vertical tubular form fill reclosable bag from a sheet of plastic film in accordance with the structure of claim 10:
wherein said attaching means includes heated thermal sealing elements for joining plastic of the film and of said interlocking members.

13. An apparatus for forming a vertical tubular form fill reclosable bag from a sheet of plastic film in accordance with the structure of claim 10:
including means for laterally cross-sealing and cutting the film after attachment of the interlocking members for encapsulating contents within the film supplied through the tube.

14. An apparatus for forming a vertical tubular form fill reclosable bag from a sheet of plastic film in accordance with the structure of claim 10:
wherein said feed means positions the interlocking members with said web portion outwardly of the members relative to the interior of the bag formed by the film.

15. An apparatus for forming a vertical tubular form fill reclosable bag from a sheet of plastic film in accordance with the structure of claim 10:
wherein said web portion has a tear line of weakened resistance to provide a separation for the web so that the web provides a pilfer-evident means for the bag.

16. An apparatus for forming a vertical tubular form fill reclosable bag from a sheet of plastic film in accordance with the structure of claim 10:
wherein said attaching means includes sealing bars for heating the edges of the film and the webs of said interlocking members to form a thermal junction therebetween.

17. An apparatus for forming a vertical tubular form fill reclosable bag from a sheet of plastic film in accordance with the structure of claim 16:
wherein said sealing bars include embedded heating elements therein.

18. An apparatus for forming a vertical tubular form fill reclosable bag from a sheet of plastic film in accordance with the structure of claim 17:
wherein said heating elements are located to selectively heat portions of the webs to be attached to the film.

19. An apparatus for forming a vertical tubular form fill reclosable bag from a sheet of plastic film comprising in combination:
means for continuously feeding a supply of thermoplastic film to form a tube;
a supply spout for vertically dropping contents into the tube;
means guiding and wrapping said supply of film about the tube as the film moves downwardly;
first guide means positioned relative to the spout for bringing the lateral edges of the film into adjacency;
zipper feed means feeding first and second continuous zipper strips having webs with reclosable pressure interlocking members into a space between the film edges;

attaching means joining the edges of the film to said webs of said interlocking members so that said members provide the sole means for joining said film edges and the members provide a reclosable closure for a bag formed of said film;

wherein said interlocking members are joined by a web portion connecting said webs which must be separated for access to the interior of a bag formed by the film; and wherein said feed means positions said web portion inwardly of the interlocking members so that the interlocking members can be separated for access to the web.

* * * * *

REEXAMINATION CERTIFICATE (1601st)
United States Patent [19]
Ausnit

[11] B1 4,894,975
[45] Certificate Issued *Dec. 3, 1991

[54] METHOD AND APPARATUS FOR MAKING RECLOSABLE BAGS WITH FASTENER STRIPS IN A FORM FILL AND SEAL MACHINE

[75] Inventor: Steven Ausnit, New York, N.Y.

[73] Assignee: Minigrip, Inc.

Reexamination Request:
No. 90/002,190, Nov. 2, 1990

Reexamination Certificate for:
Patent No.: 4,894,975
Issued: Jan. 23, 1990
Appl. No.: 166,024
Filed: Mar. 9, 1988

[*] Notice: The portion of the term of this patent subsequent to Dec. 1, 2004 has been disclaimed.

[51] Int. Cl.$^5$ .......................... B65B 61/18; B65B 9/08
[52] U.S. Cl. ...................................... 53/412; 53/133.1; 53/139.2; 53/451; 53/551

[56] References Cited

U.S. PATENT DOCUMENTS

| | | | |
|---|---|---|---|
| 4,589,145 | 5/1986 | Van Erden | 383/5 |
| 4,601,694 | 7/1986 | Ausnit | 493/381 |
| 4,709,533 | 12/1987 | Ausnit | 53/373 |
| 4,874,257 | 10/1989 | Inagaki | 383/63 |

*Primary Examiner*—R. L. Spruill

[57] ABSTRACT

A method and apparatus for forming a tube and bag from a supply of thin thermoplastic film with the film being formed into tubular shape about a filling tube with the edges of the film brought together and joined solely by a zipper strip having reclosable pressure interlocking members thereon with the zipper strip preferably heat sealed to the film and the zipper strip having a web between the pressure interlocking members which provides a tamper-evident juncture between the edges of the film so that the web must be severed for access to the interior of a bag formed from the film, and individual bags formed from the continuous tube by filling the tube through the filling tube and cross-seaming and cutting individual bags from the continuous film tube.

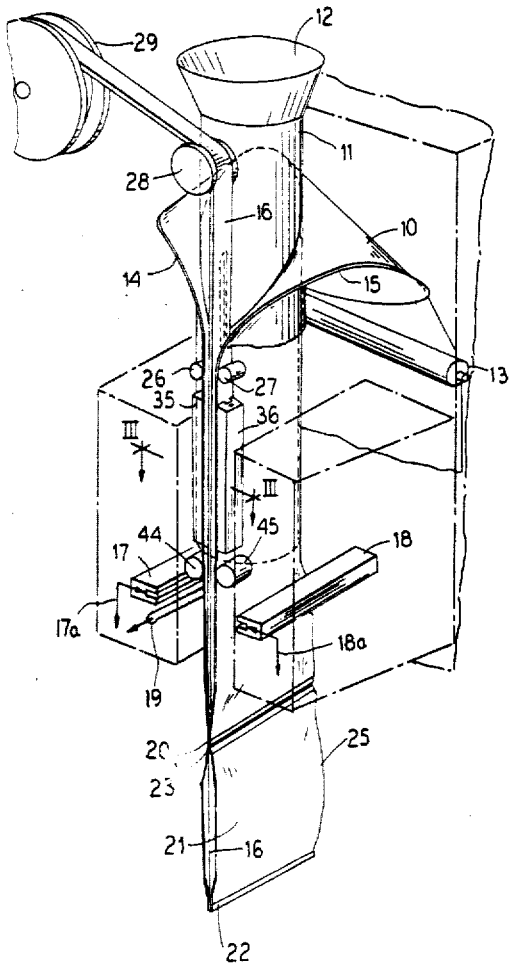

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-19 is confirmed.

* * * * *

REEXAMINATION CERTIFICATE (3058th)
United States Patent [19]
Ausnit

[11] B2 4,894,975
[45] Certificate Issued  *Nov. 19, 1996

[54] METHOD AND APPARATUS FOR MAKING RECLOSABLE BAGS WITH FASTENER STRIPS IN A FORM FILL AND SEAL MACHINE

[75] Inventor: Steven Ausnit, New York, N.Y.

[73] Assignee: Minigrip, Inc., Orangeburg, N.Y.

Reexamination Requests:
No. 90/003,882, Jun. 29, 1995
No. 90/004,071, Nov. 27, 1995

Reexamination Certificate for:
Patent No.: 4,894,975
Issued: Jan. 23, 1990
Appl. No.: 166,024
Filed: Mar. 9, 1988

Reexamination Certificate B1 4,894,975 issued Dec. 3, 1991

[ * ] Notice: The portion of the term of this patent subsequent to Dec. 1, 2004, has been disclaimed.

[51] Int. Cl.⁶ .............................. B65B 61/18; B65B 9/08
[52] U.S. Cl. .......................... 53/412; 53/133.1; 53/139.2; 53/451; 53/551

*Primary Examiner*—Linda B. Johnson

[57] ABSTRACT

A method and apparatus for forming a tube and bag from a supply of thin thermoplastic film with the film being formed into tubular shape about a filling tube with the edges of the film brought together and joined solely by a zipper strip having reclosable pressure interlocking members thereon with the zipper strip preferably heat sealed to the film and the zipper strip having a web between the pressure interlocking members which provides a tamper-evident juncture between the edges of the film so that the web must be severed for access to the interior of a bag formed from the film, and individual bags formed from the continuous tube by filling the tube through the filling tube and cross-seaming and cutting individual bags from the continuous film tube.

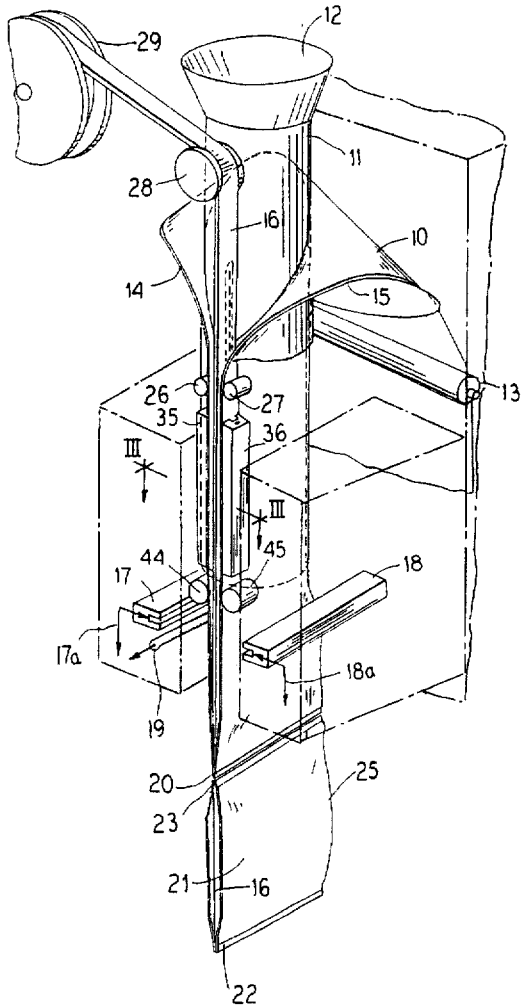

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

* * * * *